United States Patent
Usoro

(10) Patent No.: US 7,479,080 B2
(45) Date of Patent: *Jan. 20, 2009

(54) HYBRID ARCHITECTURE INCORPORATING THREE MOTOR GENERATORS AND BRAKES

(75) Inventor: Patrick B. Usoro, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 254 days.

This patent is subject to a terminal disclaimer.

(21) Appl. No.: 11/459,404

(22) Filed: Jul. 24, 2006

(65) Prior Publication Data

US 2008/0045365 A1   Feb. 21, 2008

(51) Int. Cl.
  *F16H 3/72* (2006.01)
(52) U.S. Cl. ............................ 475/5; 475/280; 475/282; 475/284; 475/286; 475/288; 475/290; 475/330; 180/65.4; 180/65.7
(58) Field of Classification Search ............... 475/5, 475/280, 282, 284, 286, 288, 290, 330; 477/3; 701/22; 180/65.2, 65.4, 65.7
See application file for complete search history.

(56) References Cited

U.S. PATENT DOCUMENTS

| | | | | |
|---|---|---|---|---|
| 5,168,946 A | * | 12/1992 | Dorgan | 180/6.44 |
| 5,558,595 A | | 9/1996 | Schmidt et al. | 477/3 |
| 5,931,757 A | | 8/1999 | Schmidt | 475/2 |
| 6,478,705 B1 | | 11/2002 | Holmes et al. | 475/5 |
| 6,527,658 B2 | | 3/2003 | Holmes et al. | 475/5 |
| 7,053,566 B2 | * | 5/2006 | Aizawa et al. | 318/34 |
| 7,371,201 B2 | * | 5/2008 | Usoro | 475/5 |
| 2002/0023790 A1 | * | 2/2002 | Hata et al. | 180/65.3 |
| 2007/0049439 A1 | * | 3/2007 | Garnett | 475/5 |
| 2008/0039258 A1 | * | 2/2008 | Usoro | 475/5 |

* cited by examiner

*Primary Examiner*—David D. Le

(57) ABSTRACT

The electrically variable transmission family of the present invention provides low-content, low-cost electrically variable transmission mechanisms including first and second differential gear sets, a battery, three electric machines serving interchangeably as motors or generators and up to three brakes. The three motor/generators are operable in a coordinated fashion to yield an EVT with a continuously variable range of speeds (including reverse). One of the brakes enables series hybrid operation.

14 Claims, 6 Drawing Sheets

Ring Gear/Sun Gear Tooth Ratios:
R1/S1 = 2.0, R2/S2 = 2.0

Ring Gear/Sun Gear Tooth Ratios:
R1/S1 = 2.0, R2/S2 = 1.8

Ring Gear/Sun Gear Tooth Ratios:
R1/S1 = 2.0, R2/S2 = 2.2

Ring Gear/Sun Gear Tooth Ratios:
R1/S1 = 2.2, R2/S2 = 1.8

Ring Gear/Sun Gear Tooth Ratios:
R1/S1 = 2.2, R2/S2 = 2.2

Ring Gear/Sun Gear Tooth Ratios:
R1/S1 = 2.0, R2/S2 = 1.8

Ring Gear/Sun Gear Tooth Ratios:
R1/S1 = 2.5, R2/S2 = 2.2

Ring Gear/Sun Gear Tooth Ratios:
R1/S1 = 2.0, R2/S2 = 2.0

HYBRID ARCHITECTURE INCORPORATING THREE MOTOR GENERATORS AND BRAKES

TECHNICAL FIELD

The present invention relates to electrically variable transmissions having two planetary gear sets, three motor/generators and up to three brakes that are controllable to provide continuously variable speed ratio ranges.

BACKGROUND OF THE INVENTION

Electric hybrid vehicles offer the potential for significant fuel economy improvements over their conventional counterparts; however, their market penetration is limited because of their relatively high cost/benefit ratio. It becomes pertinent to develop hybrid technologies that reduce cost and improve vehicle fuel economy. Two of the contributors to the cost of the hybrid vehicle are the energy storage (battery) power capacity and the size of the electric motor/generators required to realize all-electric reverse in many electric-variable-transmission (EVT)-based hybrid systems. One of the factors that affect the efficiency of the system is the operating efficiency of the motor/generators.

SUMMARY OF THE INVENTION

This invention describes continuously-variable hybrid transmissions that utilize a combination of planetary gear sets, electric motor/generators and brakes to offer multi-mode EVTs with capability for series hybrid reverse driving, thus reducing the need for massive and expensive energy storage (battery), and to minimize operating the motor/generators under highly inefficient conditions. In the series hybrid reverse driving mode, power from the engine is used to drive at least one of the motor/generators to generate electric power, and the generated electric power is delivered to at least one of the other motor/generators to drive the vehicle in the forward or reverse direction. This capability eliminates the need for significant power from the battery to drive the vehicle in reverse, as is currently the case.

The electrically variable transmission family of the present invention provides low-content, low-cost electrically variable transmission mechanisms including first and second differential gear sets, a battery (or similar energy storage device), three electric machines serving interchangeably as motors or generators and up to three brakes. Preferably, the differential gear sets are planetary gear sets, but other gear arrangements may be implemented, such as bevel gears or differential gearing to an offset axis.

In this description, the first and second planetary gear sets may be counted first to second in any order (i.e., left to right, right to left).

Each of the two planetary gear sets has three members. The first, second or third member of each planetary gear set can be any one of a sun gear, ring gear or carrier, or alternatively a pinion.

Each carrier can be either a single-pinion carrier (simple) or a double-pinion carrier (compound).

The input shaft is continuously connected with a member of the first planetary gear set. The output shaft is continuously connected with a member of the second planetary gear set.

A fixed interconnecting member continuously connects the first member of the first planetary gear set with the first member of the second planetary gear set.

A first motor/generator is connected to a member of the first planetary gear set.

A second motor/generator is connected to a member of the second planetary gear set.

A third motor/generator is connected to another member of the first or second planetary gear set.

The motor/generators are connected with the members of the planetary gear sets either directly or through other planetary gear sets, belt/chain or off-set gears with or without torque multiplication.

A first brake selectively connects a member of the first or second planetary gear set with a stationary member (transmission housing/casing). This brake is operable to hold the member stationary and enable series hybrid mode operation. Using the first brake rather than one of the motor/generators to enable the hybrid mode of operation reduces the torque capacity requirement for the motors and improves efficiency. Also, application of the first brake during electric-only drive (forward or reverse) allows the engine to be stalled without "engine start shock" that is felt in some current EVT hybrid vehicles.

An optional second brake selectively connects a member of the second planetary gear set with a stationary member and is operable to hold a member of the second planetary gear set under certain operating conditions, including operating conditions that would otherwise require one of the motor/generators to operate at zero or near-zero speeds, thereby improving efficiency by preventing the inefficient use of electric power to maintain zero or near-zero speed.

An optional third brake selectively connects another member of the first or second planetary gear set with a stationary member and is able to hold the member of the planetary gear set stationary under certain operating conditions, including operating conditions that would otherwise require one of the motor/generators to operate at zero or near-zero speeds, thereby improving efficiency by preventing the inefficient use of electric power to maintain zero or near-zero speed.

The brakes are preferably connected in parallel with the electric motor/generators. Also, the brakes are preferably electromechanically actuated to eliminate the need for high-pressure hydraulic pump and associated losses; however, other conventional brake actuation methods may be used.

The three motor/generators are operated in a coordinated fashion to yield continuously variable forward and reverse speed ratios between the input shaft and the output shaft, while minimizing the rotational speeds of the motor-generators and optimizing the overall efficiency of the system. The tooth ratios of the planetary gear sets can be suitably selected to match specific applications.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
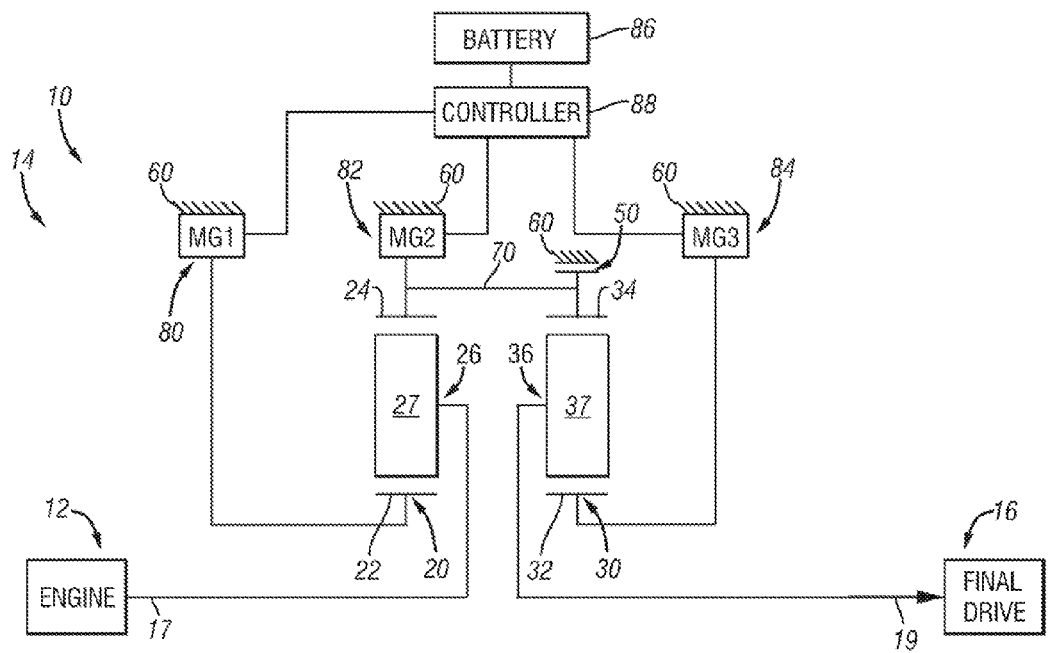
FIG. 1 is a schematic representation of a powertrain including an electrically variable transmission incorporating a family member of the present invention.

With reference to FIG. 1, a powertrain 10 is shown, including an engine 12 connected to one preferred embodiment of the improved electrically variable transmission (EVT), designated generally by the numeral 14. Transmission 14 is designed to receive at least a portion of its driving power from the engine 12. As shown, the engine 12 has an output shaft that serves as the input member 17 of the transmission 14. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 14.

An output member 19 of the transmission 14 is connected to a final drive 16.

The transmission 14 utilizes two differential gear sets, preferably in the nature of planetary gear sets 20 and 30. The planetary gear set 20 employs an outer gear member 24, typically designated as the ring gear. The ring gear member 24 circumscribes an inner gear member 22, typically designated as the sun gear. A carrier member 26 rotatably supports a plurality of planet gears 27 such that each planet gear 27 simultaneously, and meshingly engages both the outer, ring gear member 24 and the inner, sun gear member 22 of the first planetary gear set 20.

The planetary gear set 30 also employs an outer gear member 34, typically designated as the ring gear. The ring gear member 34 circumscribes an inner gear member 32, typically designated as the sun gear. A carrier member 36 rotatably supports a plurality of planet gears 37 such that each planet gear 37 simultaneously, and meshingly engages both the outer, ring gear member 34 and the inner, sun gear member 32 of the planetary gear set 30.

The input shaft 17 is continuously connected to the carrier member 26 of the planetary gear set 20. The output shaft 19 is continuously connected to the carrier member 36 of the planetary gear set 30.

A first interconnecting member 70 continuously connects the ring gear member 24 of the planetary gear set 20 with the ring gear member 34 of the planetary gear set 30.

A brake 50 selectively connects the ring gear member 34 of the planetary gear set 30 with the transmission housing 60. This brake 50 enables "series hybrid mode operation" (including series hybrid reverse and forward operation) wherein engine 12 drives the motor/generator 80 to generate electric power, and this generated electric power is delivered to motor/generator 84 to drive the vehicle in forward or reverse. This series hybrid mode operation eliminates the need for significant power from the battery 86 to drive the vehicle in reverse and therefore reduces battery size requirements.

The first embodiment 10 also incorporates first, second and third motor/generators 80, 82 and 84, respectively. The stator of the first motor/generator 80 is secured to the transmission housing 60. The rotor of the first motor/generator 80 is secured to the sun gear member 22 of the planetary gear set 20.

The stator of the second motor/generator 82 is secured to the transmission housing 60. The rotor of the second motor/generator 82 is secured to the ring gear member 24 of the planetary gear set 20 and the ring gear member 34 of the planetary gear set 30 via interconnecting member 70.

The stator of the third motor/generator 84 is secured to the transmission housing 60. The rotor of the third motor/generator 84 is secured to the sun gear member 32 of the planetary gear set 30.

Returning now to the description of the power sources, it should be apparent from the foregoing description, and with particular reference to FIG. 1, that the transmission 14 selectively receives power from the engine 12. The hybrid transmission also receives power from an electric power source 86, which is operably connected to a controller 88. The electric power source 86 may be one or more batteries. Other electric power sources, such as capacitors or fuel cells, that have the ability to provide, or store, and dispense electric power may be used in place of or in combination with batteries without altering the concepts of the present invention. The speed ratio between the input shaft and output shaft is prescribed by the speeds of the three motor/generators and the ring gear/sun gear tooth ratios of the planetary gear sets. Those with ordinary skill in the transmission art will recognize that desired input/output speed ratios can be realized by suitable selection of the speeds of the three motor/generators.

DESCRIPTION OF A SECOND EXEMPLARY EMBODIMENT

Figure 2:
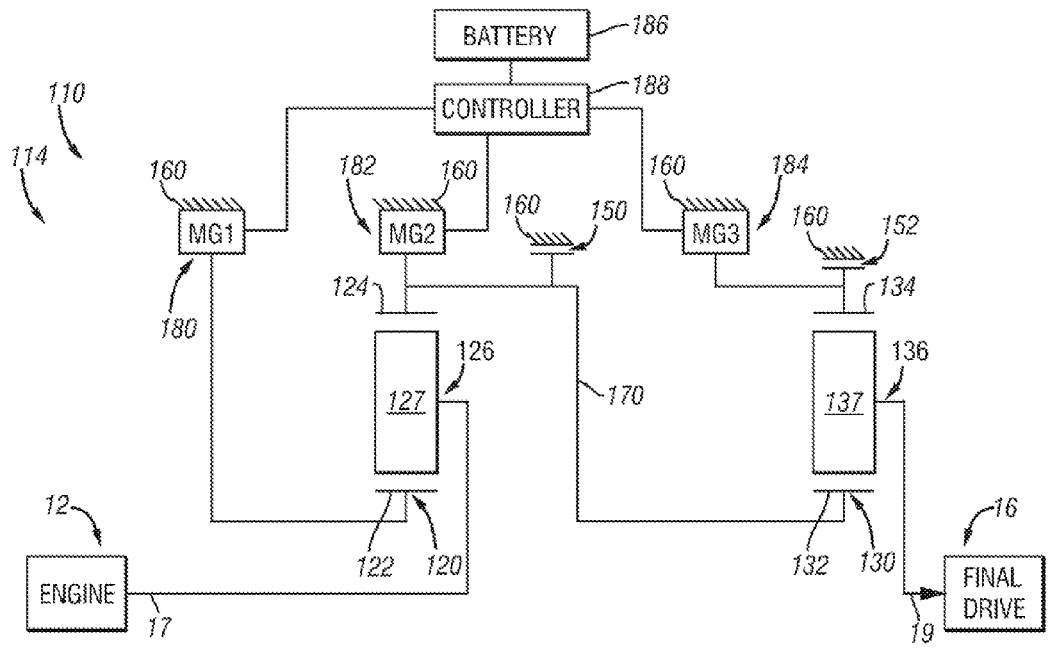
FIG. 2 is a schematic representation of a powertrain including an electrically variable transmission incorporating another family member of the present invention.

With reference to FIG. 2, a powertrain 110 is shown, including an engine 12 connected to another embodiment of the improved electrically variable transmission (EVT), designated generally by the numeral 114. Transmission 114 is designed to receive at least a portion of its driving power from the engine 12. As shown, the engine 12 has an output shaft that serves as the input member 17 of the transmission 114. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 114.

An output member 19 of the transmission 114 is connected to a final drive 16.

The transmission 114 utilizes two differential gear sets, preferably in the nature of planetary gear sets 120 and 130. The planetary gear set 120 employs an outer gear member 124, typically designated as the ring gear. The ring gear member 124 circumscribes an inner gear member 122, typically designated as the sun gear. A carrier member 126 rotatably supports a plurality of planet gears 127 such that each planet gear 127 simultaneously, and meshingly engages both the outer, ring gear member 124 and the inner, sun gear member 122 of the first planetary gear set 120.

The planetary gear set 130 also employs an outer gear member 134, typically designated as the ring gear. The ring gear member 134 circumscribes an inner gear member 132, typically designated as the sun gear. A carrier member 136 rotatably supports a plurality of planet gears 137 such that each planet gear 137 simultaneously, and meshingly engages both the outer, ring gear member 134 and the inner, sun gear member 132 of the planetary gear set 130.

The input shaft 17 is continuously connected to the carrier member 126 of the planetary gear set 120. The output shaft 19 is continuously connected to the carrier member 136 of the planetary gear set 130.

An interconnecting member 170 continuously connects ring gear member 124 of the planetary gear set 120 with the sun gear member 132 of the planetary gear set 130.

A first brake 150 selectively connects the ring gear member 124 and the sun gear member 132 via interconnecting member 170 with the transmission housing 160. This brake 150 enables series hybrid mode operation. A second brake 152 selectively connects the ring gear member 134 of the planetary gear set 130 with the transmission housing 160.

The second embodiment 110 also incorporates first, second and third motor/generators 180, 182 and 184, respectively. The stator of the first motor/generator 180 is secured to the transmission housing 160. The rotor of the first motor/generator 180 is secured to the sun gear member 122 of the planetary gear set 120.

The stator of the second motor/generator 182 is secured to the transmission housing 160. The rotor of the second motor/generator 182 is secured to the ring gear member 124 and the sun gear member 132 via interconnecting member 170.

The stator of the third motor/generator 184 is secured to the transmission housing 160. The rotor of the third motor/generator 184 is secured to the ring gear member 134 of the planetary gear set 130.

The hybrid transmission 114 receives power from the engine 12, and also exchanges power with an electric power source 186, which is operably connected to a controller 188.

DESCRIPTION OF A THIRD EXEMPLARY EMBODIMENT

Figure 3:
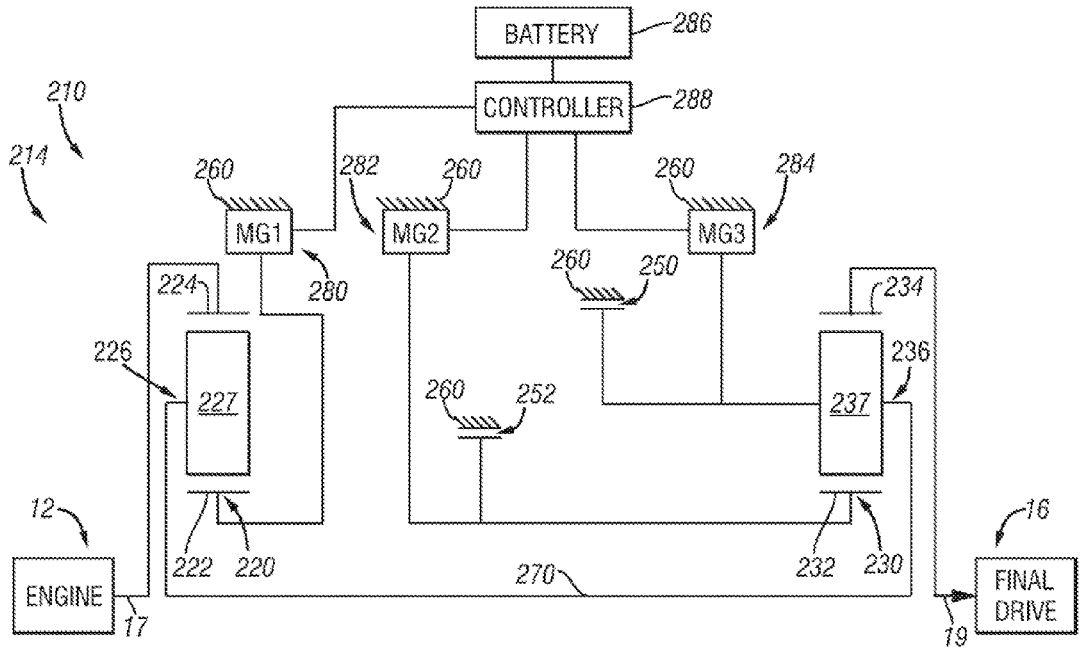
FIG. 3 is a schematic representation of a powertrain including an electrically variable transmission incorporating another family member of the present invention.

With reference to FIG. 3, a powertrain 210 is shown, including an engine 12 connected to another embodiment of the improved electrically variable transmission (EVT), designated generally by the numeral 214. Transmission 214 is designed to receive at least a portion of its driving power from the engine 12. As shown, the engine 12 has an output shaft that serves as the input member 17 of the transmission 214. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 214.

An output member 19 of the transmission 214 is connected to a final drive 16.

The transmission 214 utilizes two differential gear sets, preferably in the nature of planetary gear sets 220 and 230. The planetary gear set 220 employs an outer gear member 224, typically designated as the ring gear. The ring gear member 224 circumscribes an inner gear member 222, typically designated as the sun gear. A carrier member 226 rotatably supports a plurality of planet gears 227 such that each planet gear 227 simultaneously, and meshingly engages both the outer, ring gear member 224 and the inner, sun gear member 222 of the first planetary gear set 220.

The planetary gear set 230 also employs an outer gear member 234, typically designated as the ring gear. The ring gear member 234 circumscribes an inner gear member 232, typically designated as the sun gear. A carrier member 236 rotatably supports a plurality of planet gears 237 such that each planet gear 237 simultaneously, and meshingly engages both the outer, ring gear member 234 and the inner, sun gear member 232 of the planetary gear set 230.

The input shaft 17 is continuously connected to the ring gear member 224 of the planetary gear set 220. The output shaft 19 is continuously connected to the ring gear member 234 of the planetary gear set 230.

An interconnecting member 270 continuously connects the carrier member 226 with the carrier member 236.

A first brake 250 selectively connects the carrier member 236 with the transmission housing 260. This brake 250 enables series hybrid mode operation. A second brake 252 selectively connects the sun gear member 232 with the transmission housing 260.

The embodiment 210 also incorporates first, second and third motor/generators 280, 282 and 284, respectively. The stator of the first motor/generator 280 is secured to the transmission housing 260. The rotor of the first motor/generator 280 is secured to the sun gear member 222 of the planetary gear set 220.

The stator of the second motor/generator 282 is secured to the transmission housing 260. The rotor of the second motor/generator 282 is secured to the sun gear member 232 of the planetary gear set 230.

The stator of the third motor/generator 284 is secured to the transmission housing 260. The rotor of the third motor/generator 284 is secured to the carrier member 236 of the planetary gear set 230.

The hybrid transmission 214 receives power from the engine 12, and also exchanges power with an electric power source 286, which is operably connected to a controller 288.

DESCRIPTION OF A FOURTH EXEMPLARY EMBODIMENT

Figure 4:
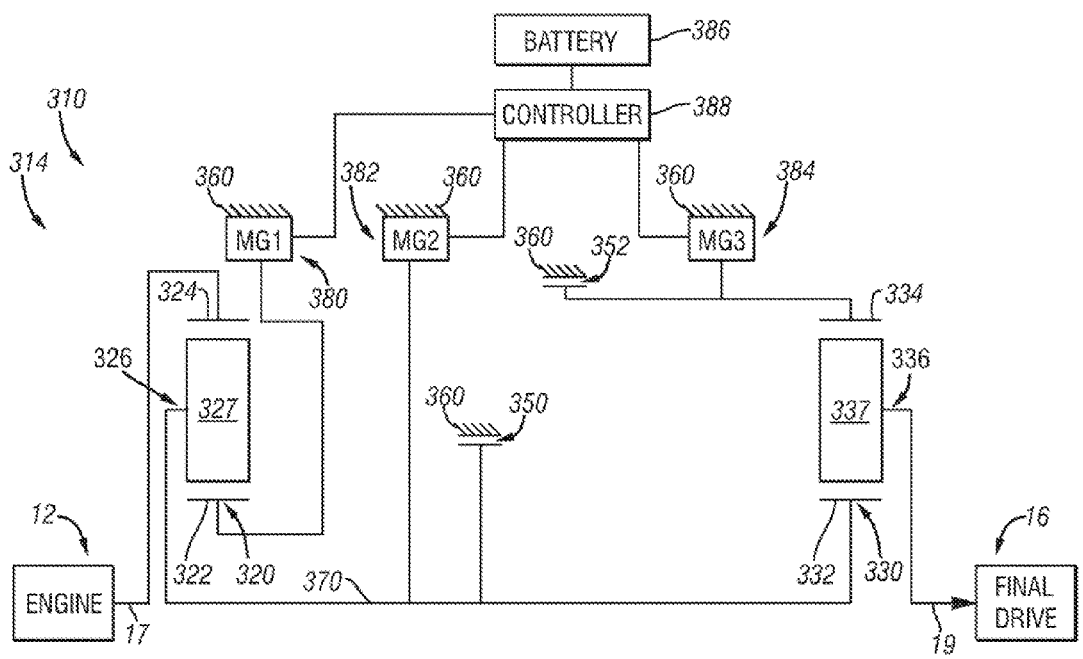
FIG. 4 is a schematic representation of a powertrain including an electrically variable transmission incorporating another family member of the present invention.

With reference to FIG. 4, a powertrain 310 is shown, including an engine 12 connected to another embodiment of the improved electrically variable transmission (EVT), designated generally by the numeral 314. Transmission 314 is designed to receive at least a portion of its driving power from the engine 12. As shown, the engine 12 has an output shaft that serves as the input member 17 of the transmission 314. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 14. An output member 19 of the transmission 314 is connected to a final drive 16.

The transmission 314 utilizes two differential gear sets, preferably in the nature of planetary gear sets 320 and 330. The planetary gear set 320 employs an outer gear member 324, typically designated as the ring gear. The ring gear member 324 circumscribes an inner gear member 322, typically designated as the sun gear. A carrier member 326 rotatably supports a plurality of planet gears 327 such that each planet gear 327 simultaneously, and meshingly engages both the outer, ring gear member 324 and the inner, sun gear member 322 of the first planetary gear set 320.

The planetary gear set 330 also employs an outer gear member 334, typically designated as the ring gear. The ring gear member 334 circumscribes an inner gear member 332, typically designated as the sun gear. A carrier member 336 rotatably supports a plurality of planet gears 337 such that each planet gear 337 simultaneously, and meshingly engages both the outer, ring gear member 334 and the inner, sun gear member 332 of the planetary gear set 330.

The input shaft 17 is continuously connected to the ring gear member 324 of the planetary gear set 320. The output shaft 19 is continuously connected to the carrier member 336 of the planetary gear set 330.

An interconnecting member 370 continuously connects the carrier member 326 with the sun gear member 332.

A first brake 350 selectively connects the sun gear member 332 and the carrier member 326 via interconnecting member 370 with the transmission housing 360. This brake 350 enables series hybrid mode operation. A second brake 352 selectively connects the ring gear member 334 with the transmission housing 360.

The embodiment 310 also incorporates first, second and third motor/generators 380, 382 and 384, respectively. The stator of the first motor/generator 380 is secured to the transmission housing 360. The rotor of the first motor/generator 380 is secured to the sun gear member 322.

The stator of the second motor/generator 382 is secured to the transmission housing 360. The rotor of the second motor/generator 382 is secured to the carrier member 326 and the sun gear member 332 via interconnecting member 370.

The stator of the third motor/generator 384 is secured to the transmission housing 360. The rotor of the third motor/generator 384 is secured to the ring gear member 334.

The hybrid transmission 314 receives power from the engine 12, and also exchanges power with an electric power source 386, which is operably connected to a controller 388.

DESCRIPTION OF A FIFTH EXEMPLARY EMBODIMENT

Figure 5:
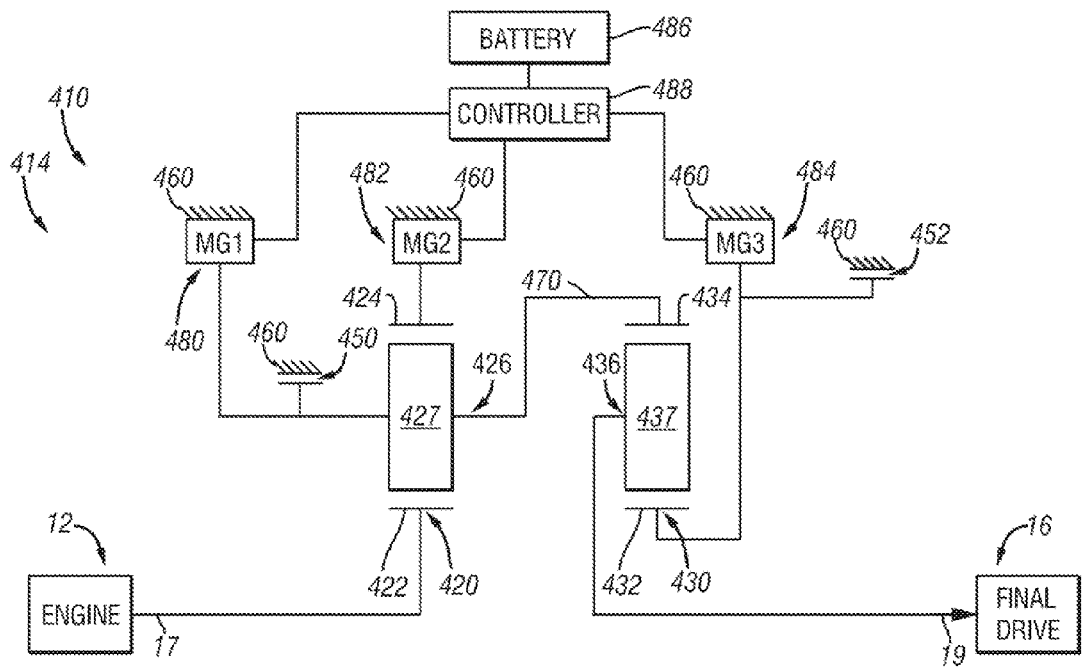
FIG. 5 is a schematic representation of a powertrain including an electrically variable transmission incorporating another family member of the present invention.

With reference to FIG. 5, a powertrain 410 is shown, including an engine 12 connected to another embodiment of the improved electrically variable transmission (EVT), designated generally by the numeral 414. Transmission 414 is designed to receive at least a portion of its driving power from the engine 12. As shown, the engine 12 has an output shaft that serves as the input member 17 of the transmission 414. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 414. An output member 19 of the transmission 414 is connected to a final drive 16.

The transmission 414 utilizes two differential gear sets, preferably in the nature of planetary gear sets 420 and 430. The planetary gear set 420 employs an outer gear member 424, typically designated as the ring gear. The ring gear member 424 circumscribes an inner gear member 422, typically designated as the sun gear. A carrier member 426 rotatably supports a plurality of planet gears 427 such that each planet gear 427 simultaneously, and meshingly engages both the outer, ring gear member 424 and the inner, sun gear member 422 of the first planetary gear set 420.

The planetary gear set 430 also employs an outer gear member 434, typically designated as the ring gear. The ring gear member 434 circumscribes an inner gear member 432, typically designated as the sun gear. A carrier member 436 rotatably supports a plurality of planet gears 437 such that each planet gear 437 simultaneously, and meshingly engages both the outer, ring gear member 434 and the inner, sun gear member 432 of the planetary gear set 430.

The input shaft 17 is continuously connected to the sun gear member 422. The output shaft 19 is continuously connected to the carrier member 436.

An interconnecting member 470 continuously connects the carrier member 426 with the ring gear member 434.

A first brake 450 selectively connects the carrier member 426 and the ring gear member 434 via interconnecting member 470 with the transmission housing 460. This brake 450 enables series hybrid mode operation. A second brake 452 selectively connects the sun gear member 432 with the transmission housing 460.

The embodiment 410 also incorporates first, second and third motor/generators 480, 482 and 484, respectively. The stator of the first motor/generator 480 is secured to the transmission housing 460. The rotor of the first motor/generator 480 is secured to the carrier member 426.

The stator of the second motor/generator 482 is secured to the transmission housing 460. The rotor of the second motor/generator 482 is secured to the ring gear member 424.

The stator of the third motor/generator 484 is secured to the transmission housing 460. The rotor of the third motor/generator 484 is secured to the sun gear member 432.

The hybrid transmission 414 receives power from the engine 12, and also exchanges power with an electric power source 486, which is operably connected to a controller 488.

DESCRIPTION OF A SIXTH EXEMPLARY EMBODIMENT

Figure 6:
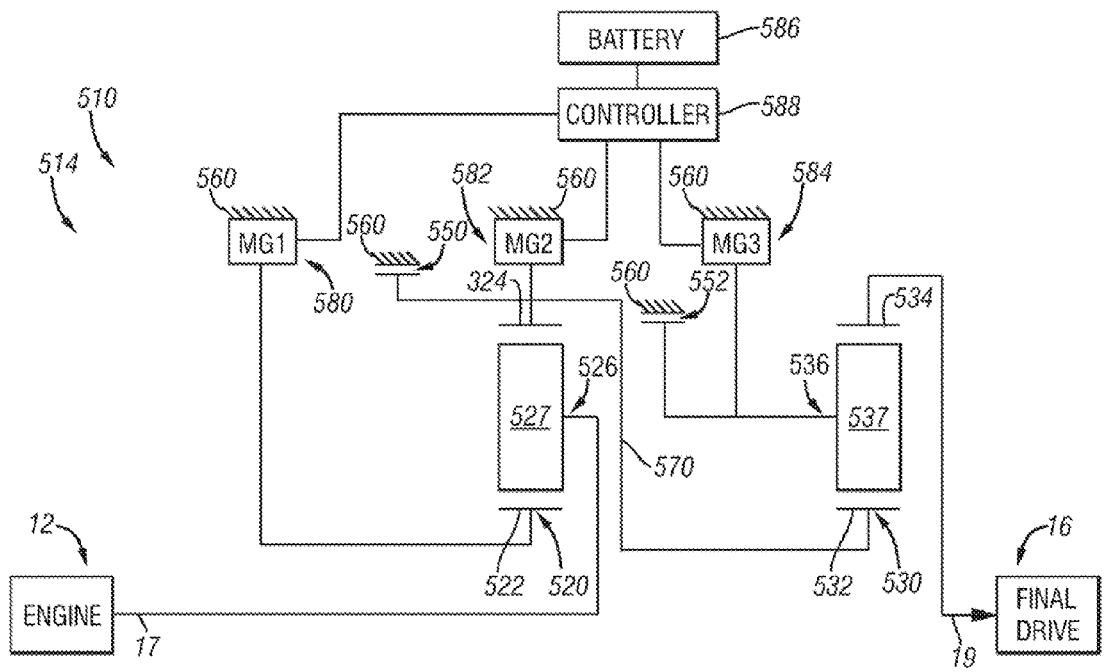
FIG. 6 is a schematic representation of a powertrain including an electrically variable transmission incorporating another family member of the present invention.

With reference to FIG. 6, a powertrain 510 is shown, including an engine 12 connected to another embodiment of the improved electrically variable transmission (EVT), designated generally by the numeral 514. Transmission 514 is designed to receive at least a portion of its driving power from the engine 12. As shown, the engine 12 has an output shaft that serves as the input member 17 of the transmission 514. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 514. An output member 19 of the transmission 514 is connected to a final drive 16.

The transmission 514 utilizes two differential gear sets, preferably in the nature of planetary gear sets 520 and 530. The planetary gear set 520 employs an outer gear member 524, typically designated as the ring gear. The ring gear member 524 circumscribes an inner gear member 522, typically designated as the sun gear. A carrier member 526 rotatably supports a plurality of planet gears 527 such that each planet gear 527 simultaneously, and meshingly engages both the outer, ring gear member 524 and the inner, sun gear member 522 of the planetary gear set 520.

The planetary gear set 530 also employs an outer gear member 534, typically designated as the ring gear. The ring gear member 534 circumscribes an inner gear member 532, typically designated as the sun gear. A carrier member 536 rotatably supports a plurality of planet gears 537 such that each planet gear 537 simultaneously, and meshingly engages both the outer, ring gear member 534 and the inner, sun gear member 532 of the planetary gear set 530.

The input shaft 17 is continuously connected to the carrier member 526. The output shaft 19 is continuously connected to the ring gear member 534.

An interconnecting member 570 continuously connects the ring gear member 524 with the sun gear member 532.

A first brake 550 selectively connects the ring gear member 524 with the transmission housing 560. This brake 550 enables series hybrid mode operation. A second brake 552 selectively connects the carrier member 536 with the transmission housing 560.

The embodiment 510 also incorporates first, second and third motor/generators 580, 582 and 584, respectively. The stator of the first motor/generator 580 is secured to the transmission housing 560. The rotor of the first motor/generator 580 is secured to the sun gear member 522.

The stator of the second motor/generator 582 is secured to the transmission housing 560. The rotor of the second motor/generator 582 is secured to the ring gear member 524 and the sun gear member 532 via the interconnecting member 570.

The stator of the third motor/generator 584 is secured to the transmission housing 560. The rotor of the third motor/generator 584 is secured to the carrier member 536.

The hybrid transmission 514 receives power from the engine 12, and also exchanges power with an electric power source 586, which is operably connected to a controller 588.

DESCRIPTION OF A SEVENTH EXEMPLARY EMBODIMENT

Figure 7:
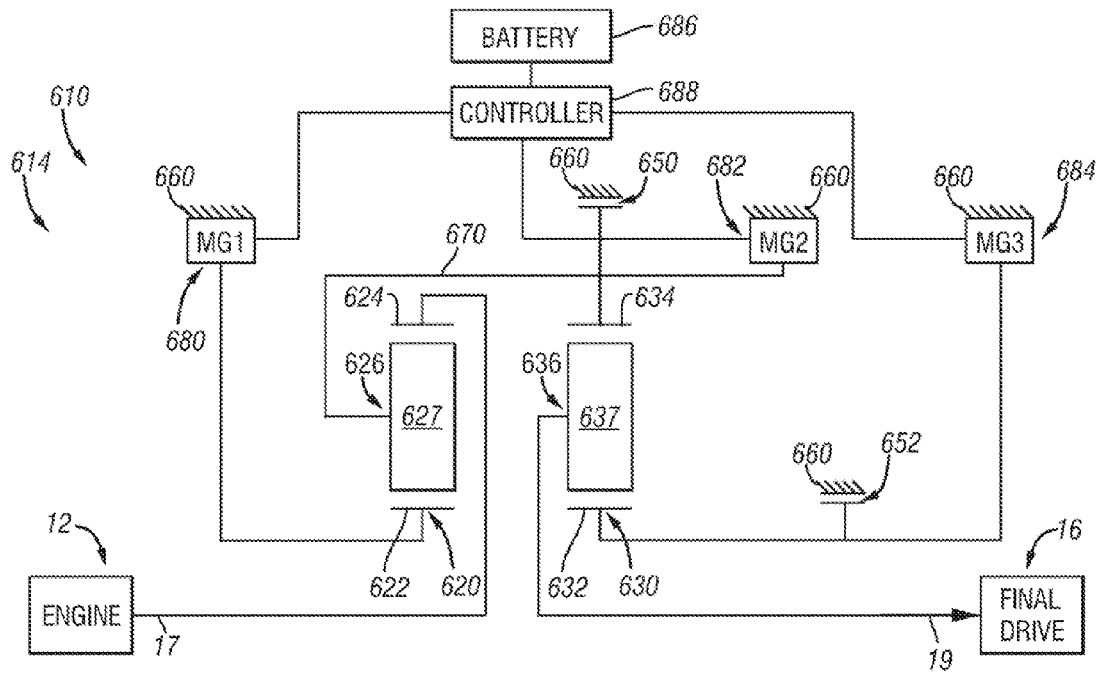
FIG. 7 is a schematic representation of a powertrain including an electrically variable transmission incorporating another family member of the present invention.

With reference to FIG. 7, a powertrain 610 is shown, including an engine 12 connected to another embodiment of the improved electrically variable transmission (EVT), designated generally by the numeral 614. Transmission 614 is designed to receive at least a portion of its driving power from the engine 12. As shown, the engine 12 has an output shaft that serves as the input member 17 of the transmission 614. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 614. An output member 19 of the transmission 614 is connected to a final drive 16.

The transmission 614 utilizes two differential gear sets, preferably in the nature of planetary gear sets 620 and 630. The planetary gear set 620 employs an outer gear member 624, typically designated as the ring gear. The ring gear member 624 circumscribes an inner gear member 622, typically designated as the sun gear. A carrier member 626 rotatably supports a plurality of planet gears 627 such that each planet gear 627 simultaneously, and meshingly engages both the outer, ring gear member 624 and the inner, sun gear member 622 of the first planetary gear set 620.

The planetary gear set 630 also employs an outer gear member 634, typically designated as the ring gear. The ring gear member 634 circumscribes an inner gear member 632, typically designated as the sun gear. A carrier member 636 rotatably supports a plurality of planet gears 637 such that each planet gear 637 simultaneously, and meshingly engages both the outer, ring gear member 634 and the inner, sun gear member 632 of the planetary gear set 630.

The input shaft 17 is continuously connected to the ring gear member 624. The output shaft 19 is continuously connected to the carrier member 636.

An interconnecting member 670 continuously connects the carrier member 626 with the ring gear member 634.

A first brake 650 selectively connects the ring gear member 634 and the carrier member 626 via interconnecting member 670 with the transmission housing 660. This brake 650 enables series hybrid mode operation. A second brake 652 selectively connects the sun gear member 632 with the transmission housing 660.

The embodiment 610 also incorporates first, second and third motor/generators 680, 682 and 684, respectively. The stator of the first motor/generator 680 is secured to the transmission housing 660. The rotor of the first motor/generator 680 is secured to the sun gear member 622.

The stator of the second motor/generator 682 is secured to the transmission housing 660. The rotor of the second motor/generator 682 is secured to the ring gear member 634.

The stator of the third motor/generator 684 is secured to the transmission housing 660. The rotor of the third motor/generator 684 is secured to the sun gear member 632.

The hybrid transmission 614 receives power from the engine 12, and also exchanges power with an electric power source 686, which is operably connected to a controller 688.

DESCRIPTION OF A EIGHTH EXEMPLARY EMBODIMENT

Figure 8:
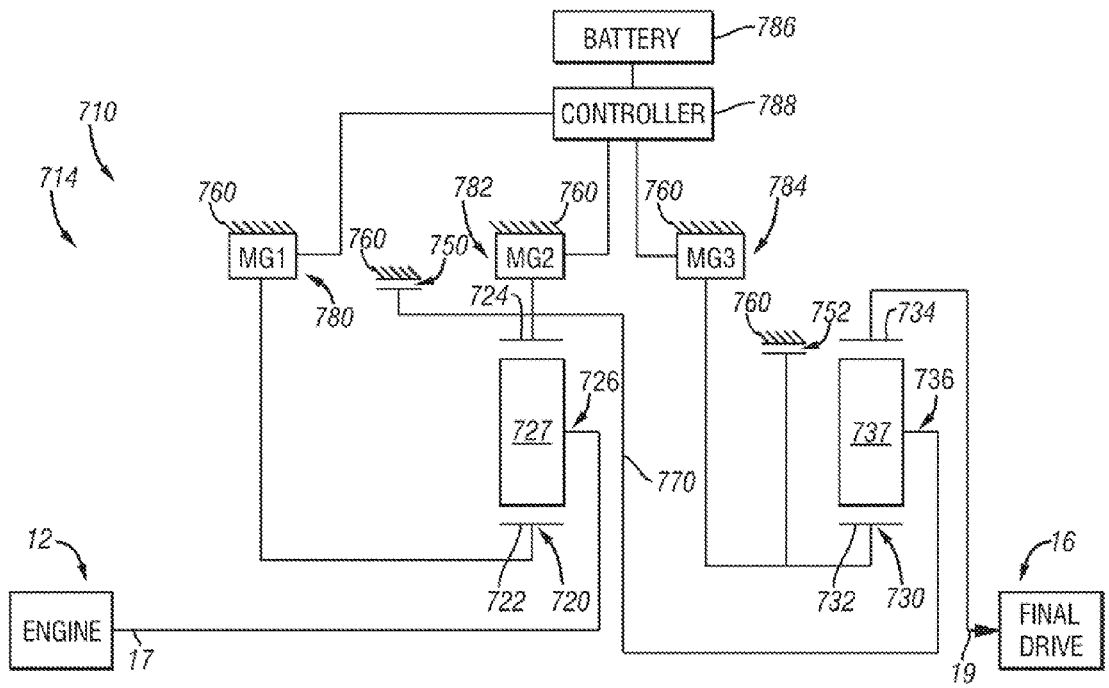
FIG. 8 is a schematic representation of a powertrain including an electrically variable transmission incorporating another family member of the present invention.

With reference to FIG. 8, a powertrain 710 is shown, including an engine 12 connected to another embodiment of the improved electrically variable transmission (EVT), designated generally by the numeral 714. Transmission 714 is designed to receive at least a portion of its driving power from the engine 12. As shown, the engine 12 has an output shaft that serves as the input member 17 of the transmission 714. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 714. An output member 19 of the transmission 714 is connected to a final drive 16.

The transmission 714 utilizes two differential gear sets, preferably in the nature of planetary gear sets 720 and 730. The planetary gear set 720 employs an outer gear member 724, typically designated as the ring gear. The ring gear member 724 circumscribes an inner gear member 722, typically designated as the sun gear. A carrier member 726 rotatably supports a plurality of planet gears 727 such the each planet gear 727 simultaneously, and meshingly engages both the outer, ring gear member 724 and the inner, sun gear member 722 of the planetary gear set 720.

The planetary gear set 730 also employs an outer gear member 734, typically designated as the ring gear. The ring gear member 734 circumscribes an inner gear member 732, typically designated as the sun gear. A carrier member 736 rotatably supports a plurality of planet gears 737 such that each planet gear 737 simultaneously, and meshingly engages both the outer, ring gear member 734 and the inner, sun gear member 732 of the planetary gear set 730.

The input shaft 17 is continuously connected to the carrier member 726. The output shaft 19 is continuously connected to the ring gear member 734.

An interconnecting member 770 continuously connects the ring gear member 724 with the carrier member 736.

A first brake 750 selectively connects the ring gear member 724 and the carrier member 736 via the interconnecting member 770 with the transmission housing 760. This brake 750 enables series hybrid mode operation. A second brake 752 selectively connects the sun gear member 732 with the transmission housing 760.

The embodiment 710 also incorporates first, second and third motor/generators 780, 782 and 784, respectively. The stator of the first motor/generator 780 is secured to the transmission housing 760. The rotor of the first motor/generator 780 is secured to the sun gear member 722.

The stator of the second motor/generator 782 is secured to the transmission housing 760. The rotor of the second motor/generator 782 is secured to the ring gear member 724 and the carrier member 736 via interconnecting member 770.

The stator of the third motor/generator 784 is secured to the transmission housing 760. The rotor of the third motor/generator 784 is secured to the sun gear member 732.

The hybrid transmission 714 receives power from the engine 12, and also exchanges power with an electric power source 786, which is operably connected to a controller 788.

DESCRIPTION OF A NINTH EXEMPLARY EMBODIMENT

Figure 9:
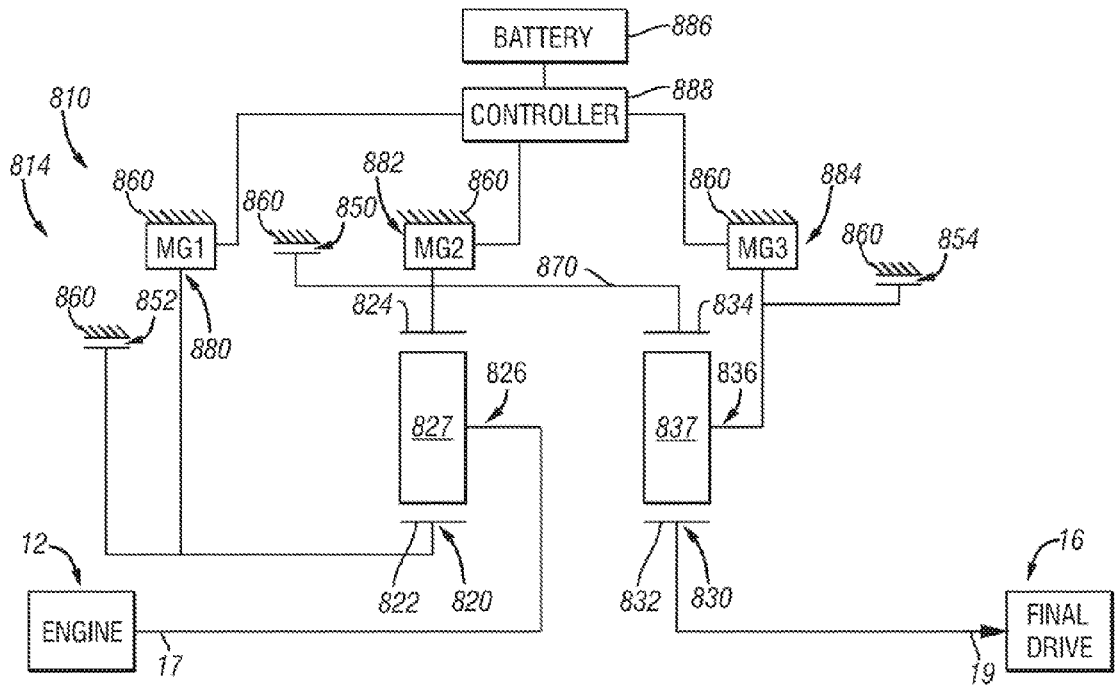
FIG. 9 is a schematic representation of a powertrain including an electrically variable transmission incorporating another family member of the present invention.

With reference to FIG. 9, a powertrain 810 is shown, including an engine 12 connected to another embodiment of the improved electrically variable transmission (EVT), designated generally by the numeral 814. Transmission 814 is designed to receive at least a portion of its driving power from the engine 12. As shown, the engine 12 has an output shaft that serves as the input member 17 of the transmission 814. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 814. An output member 19 of the transmission 814 is connected to a final drive 16.

The transmission 814 utilizes two differential gear sets, preferably in the nature of planetary gear sets 820 and 830. The planetary gear set 820 employs an outer gear member 824, typically designated as the ring gear. The ring gear member 824 circumscribes an inner gear member 822, typically designated as the sun gear. A carrier member 826 rotatably supports a plurality of planet gears 827 such that each planet gear 827 simultaneously, and meshingly engages both the outer, ring gear member 824 and the inner, sun gear member 822 of the planetary gear set 820.

The planetary gear set 830 also employs an outer gear member 834, typically designated as the ring gear. The ring gear member 834 circumscribes an inner gear member 832, typically designated as the sun gear. A carrier member 836 rotatably supports a plurality of planet gears 837 such that each planet gear 837 simultaneously, and meshingly engages both the outer, ring gear member 834 and the inner, sun gear member 832 of the planetary gear set 830.

The input shaft 17 is continuously connected to the carrier member 826. The output shaft 19 is continuously connected to the sun gear member 832.

An interconnecting member 870 continuously connects the ring gear member 824 with the ring gear member 834.

A first brake 850 selectively connects the ring gear member 824 with the transmission housing 860. This brake 850 enables series hybrid mode operation. A second brake 852 selectively connects the sun gear member 822 with the transmission housing 860. A third brake 854 selectively connects the carrier member 836 with the transmission housing 860.

The embodiment 810 also incorporates first, second and third motor/generators 880, 882 and 884, respectively. The stator of the first motor/generator 880 is secured to the transmission housing 860. The rotor of the first motor/generator 880 is secured to the sun gear member 822.

The stator of the second motor/generator 882 is secured to the transmission housing 860. The rotor of the second motor/ generator 882 is secured to the ring gear member 824 and the ring gear member 834 via interconnecting member 870.

The stator of the third motor/generator 884 is secured to the transmission housing 860. The rotor of the third motor/generator 884 is secured to the carrier member 836.

The hybrid transmission 814 receives power from the engine 12, and also exchanges power with an electric power source 886, which is operably connected to a controller 888.

DESCRIPTION OF A TENTH EXEMPLARY EMBODIMENT

Figure 10:
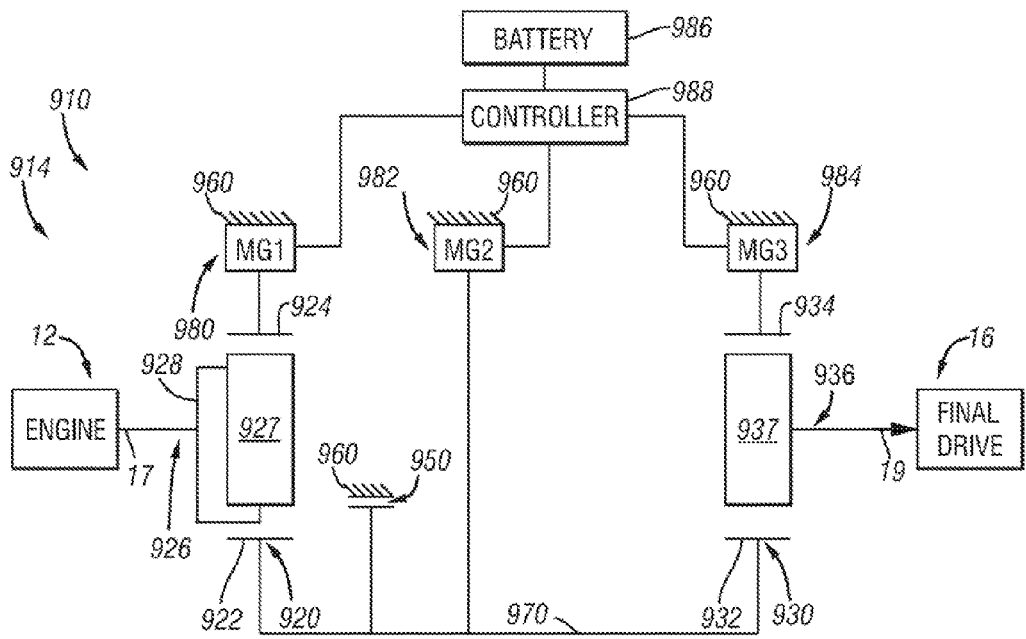
FIG. 10 is a schematic representation of a powertrain including an electrically variable transmission incorporating another family member of the present invention.

With reference to FIG. 10, a powertrain 910 is shown, including an engine 12 connected to another embodiment of the improved electrically variable transmission (EVT), designated generally by the numeral 914. Transmission 914 is designed to receive at least a portion of its driving power from the engine 12. As shown, the engine 12 has an output shaft that serves as the input member 17 of the transmission 914. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 914. An output member 19 of the transmission 914 is connected to a final drive 16.

The transmission 914 utilizes two differential gear sets, preferably in the nature of planetary gear sets 920 and 930. The planetary gear set 920 employs an outer gear member 924, typically designated as the ring gear. The ring gear member 924 circumscribes an inner gear member 922, typically designated as the sun gear. A carrier member 926 rotatably supports a plurality of planet gears 927, 928 such that each planet gear 927 meshingly engages the outer, ring gear member 924 and each planet, gear 928 simultaneously, and meshingly engages both the inner, sun gear member 922 and the respective planet gear 927 of the planetary gear set 920.

The planetary gear set 930 employs an outer gear member 934, typically designated as the ring gear. The ring gear member 934 circumscribes an inner gear member 932, typically designated as the sun gear. A carrier member 936 rotatably supports a plurality of planet gears 937 such that each planet gear 937 simultaneously, and meshingly engages both the outer, ring gear member 934 and the inner, sun gear member 932 of the planetary gear set 930.

The input shaft 17 is continuously connected to the carrier member 926. The output shaft 19 is continuously connected to the carrier member 936.

An interconnecting member 970 continuously connects the sun gear member 922 with the sun gear member 932.

A first brake 950 selectively connects the sun gear member 922 and the sun gear member 932 via interconnecting member 970 with the transmission housing 960. This brake 950 enables series hybrid mode operation.

The embodiment 910 also incorporates first, second and third motor/generators 980, 982 and 984, respectively. The stator of the first motor/generator 980 is secured to the transmission housing 960. The rotor of the first motor/generator 980 is secured to the ring gear member 924.

The stator of the second motor/generator 982 is secured to the transmission housing 960. The rotor of the second motor/generator 982 is secured to the sun gear member 922 and the sun gear member 932 via the interconnecting member 970.

The stator of the third motor/generator 984 is secured to the transmission housing 960. The rotor of the third motor/generator 984 is secured to the ring gear member 934.

The hybrid transmission 914 receives power from the engine 12, and also exchanges power with an electric power source 986, which is operably connected to a controller 988.

DESCRIPTION OF A ELEVENTH EXEMPLARY EMBODIMENT

Figure 11:
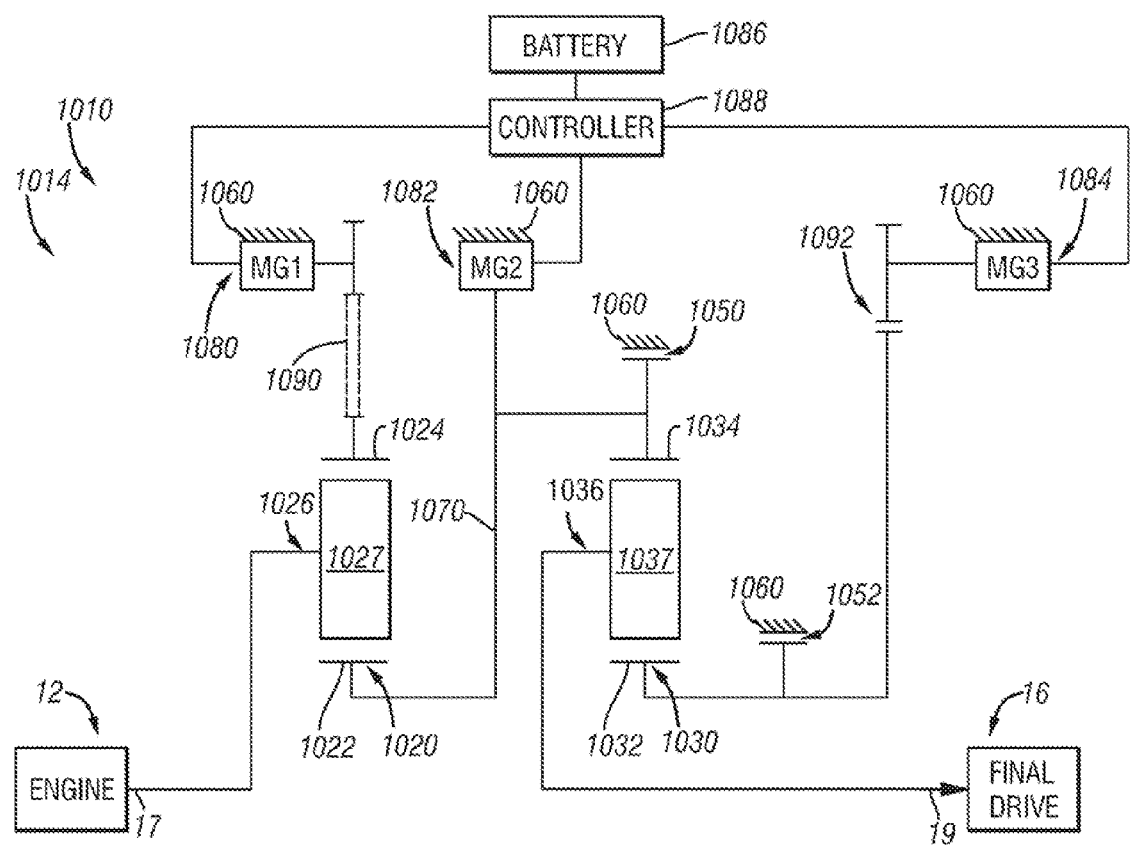
FIG. 11 is a schematic representation of a powertrain including an electrically variable transmission incorporating another family member of the present invention.

With reference to FIG. 11, a powertrain 1010 is shown, including an engine 12 connected to another embodiment of the improved electrically variable transmission (EVT), designated generally by the numeral 1014. Transmission 1014 is designed to receive at least a portion of its driving power from the engine 12. As shown, the engine 12 has an output shaft that serves as the input member 17 of the transmission 1014. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 1014. An output member 19 of the transmission 1014 is connected to a final drive 16.

The transmission 1014 utilizes two differential gear sets, preferably in the nature of planetary gear sets 1020 and 1030. The planetary gear set 1020 employs an outer gear member 1024, typically designated as the ring gear. The ring gear member 1024 circumscribes an inner gear member 1022, typically designated as the sun gear. A carrier member 1026 rotatably supports a plurality of planet gears 1027 such that each planet gear 1027 simultaneously, and meshingly engages both the outer, ring gear member 1024 and the inner, sun gear member 1022 of the planetary gear set 1020.

The planetary gear set 1030 also employs an outer gear member 1034, typically designated as the ring gear. The ring gear member 1034 circumscribes an inner gear member 1032, typically designated as the sun gear. A carrier member 1036 rotatably supports a plurality of planet gears 1037 such that each planet gear 1037 simultaneously, and meshingly engages both the outer, ring gear member 1034 and the inner, sun gear member 1032 of the planetary gear set 1030.

The input shaft 17 is continuously connected to the carrier member 1026. The output shaft 19 is continuously connected to the carrier member 1036.

An interconnecting member 1070 continuously connects the sun gear member 1022 with the ring gear member 1034.

A first brake 1050 selectively connects the ring gear member 1034 and the sun gear member 1022 via interconnecting member 1070 with the transmission housing 1060. This brake 1050 enables series hybrid mode operation. A second brake 1052 selectively connects the sun gear member 1032 with the transmission housing 1060.

The embodiment 1010 also incorporates first, second and third motor/generators 1080, 1082 and 1084, respectively. The stator of the first motor/generator 1080 is secured to the transmission housing 1060. The rotor of the first motor/generator 1080 is secured to the ring gear member 1024 via an offset drive 1090, such as a belt or chain, which may change the speed ratio.

The stator of the second motor/generator 1082 is secured to the transmission housing 1060. The rotor of the second motor/generator 1082 is secured to the ring gear member 1034.

The stator of the third motor/generator 1084 is secured to the transmission housing 1060. The rotor of the third motor/generator 1084 is secured to the sun gear member 1032 via offset gear 1092, which may change the speed ratio.

The hybrid transmission 1014 receives power from the engine 12, and also exchanges power with an electric power source 1086, which is operably connected to a controller 1088.

While the best modes for carrying out the invention have been described in detail, those familiar with the art to which this invention relates will recognize various alternative designs and embodiments for practicing the invention within the scope of the appended claims.

The invention claimed is:

1. An electrically variable transmission comprising:
   an input member to receive power from an engine;
   an output member;
   first, second and third motor/generators;
   first and second differential gear sets each having first, second and third members;
   said input member being continuously connected with a member of said first gear set, and said output member being continuously connected with a member of said second gear set;
   an interconnecting member continuously connecting said first member of said first gear set with said first member of said second gear set;
   a brake selectively connecting a member of said first or second gear set with a stationary member for enabling series hybrid reverse operation in the electrically variable transmission;
   said first motor/generator being continuously connected with a member of said first gear set;
   said second motor/generator being continuously connected with a member of said second gear set;
   said third motor/generator being continuously connected with another member of said first or second gear set;
   wherein said first, second and third motor/generators are operable in a coordinated fashion to provide said electrically variable transmission with a continuously variable range of speed ratios between said input member and said output member.

2. The electrically variable transmission of claim 1, wherein at least one of said motor/generators is connected with said gear sets through at least one fixed or variable speed ratio device.

3. The electrically variable transmission of claim 1, wherein said first and second differential gear sets are planetary gear sets.

4. The electrically variable transmission of claim 3, wherein at least one carrier of said planetary gear sets is a double-pinion carrier.

5. The electrically variable transmission of claim 3, wherein carriers of each of said planetary gear sets are single-pinion carriers.

6. The electrically variable transmission of claim 1, further comprising:
   a second brake selectively connecting a member of said first or second gear set with said stationary member.

7. The electrically variable transmission of claim 6, further comprising:
   a third brake selectively connecting another member of said first or second gear set with said stationary member.

8. An electrically variable transmission comprising:
   an input member to receive power from an engine;
   an output member;
   first, second and third motor/generators;
   first and second differential gear sets each having first, second and third members;
   said input member being continuously connected with a member of said first gear set, and said output member being continuously connected with a member of said second gear set;
   an interconnecting member continuously connecting said first member of said first gear set with said first member of said second gear set;
   a brake selectively connecting a member of said first or second gear set with a stationary member for enabling series hybrid reverse operation in the electrically variable transmission;
   said first, second and third motor/generators being continuously connected with members of said gear sets;
   wherein said first, second and third motor/generators are operable in a coordinated fashion to provide said electrically variable transmission with a continuously variable range of speed ratios between said input member and said output member.

9. The electrically variable transmission of claim 8, wherein said first and second differential gear sets are planetary gear sets.

10. The electrically variable transmission of claim 8, wherein carriers of each of said planetary gear sets are single-pinion carriers.

11. The electrically variable transmission of claim 8, wherein at least one carrier of said planetary gear sets is a double-pinion carrier.

12. The electrically variable transmission of claim 8, wherein at least one of said motor/generators is connected with said gear sets through at least one fixed or variable speed ratio device.

13. The electrically variable transmission of claim 8, further comprising:
   a second brake selectively connecting a member of said second gear set with said stationary member.

14. The electrically variable transmission of claim 13, further comprising:
   a third brake selectively connecting a member of said first or second gear sets with said stationary member.

* * * * *